United States Patent [19]

Flood et al.

[11] Patent Number: 5,287,548
[45] Date of Patent: Feb. 15, 1994

[54] PROGRAMMABLE CONTROLLER HAVING A STORED PROGRAM WITH BOTH MACHINE LANGUAGE INSTRUCTIONS AND SOURCE CODE DATA

[75] Inventors: Mark A. Flood; Michael D. Kalan, both of Mayfield Heights; Charles M. Rischar, Painsville; Robert R. Sepsi, Richmond Heights; Jack F. Toma, Parma, all of Ohio

[73] Assignee: Allen-Bradley Company, Inc., Milwaukee, Wis.

[21] Appl. No.: 161,484

[22] Filed: Feb. 29, 1988

[51] Int. Cl.$^5$ .......................... G06F 9/30; G06F 9/45
[52] U.S. Cl. ................................ 395/375; 395/575; 364/147; 364/192; 364/DIG. 2; 364/949; 364/926.9; 364/946.2; 364/946.9; 371/19
[58] Field of Search ........ 364/200, 902, 200 MS File, 364/900 MS File, 147, 191-193; 371/19; 395/700

[56] References Cited

U.S. PATENT DOCUMENTS

3,810,118  5/1974  Kiffmeyer ........................... 395/775
4,413,319  11/1983  Schultz et al. ...................... 395/275

Primary Examiner—Paul V. Kulik
Attorney, Agent, or Firm—George E. Haas; John Horn

[57] ABSTRACT

A programmable controller governs the operation of a piece of equipment by executing machine language instructions compiled from a ladder diagram type control program. The control program as stored in the controller includes not only compiled machine language instructions, but also a tokenized version of the source code from which certain machine language instructions were compiled. The source code is provided only for those portions of the machine language program which cannot be easily decompiled to produce the corresponding source code. This program storage facilitates subsequent editing of the stored program via a terminal connected to the programmable controller. During the editing process, the original ladder diagram can be reconstructed from a combination of the machine language instructions and the tokenized version of the source code. In doing so, the machine language instructions, which have a one-to-one correspondence with the source code instructions, are decompiled using conventional techniques. However, the tokenized version of the source code is used to recreate the portions of the ladder diagram for which each machine language instruction does not have a unique one-to-one correspondence with a source code instruction. This program storage technique enables the control program to be easily edited using the version stored in the programmable controller without requiring access to the original source code from which the program was compiled.

18 Claims, 7 Drawing Sheets

FIG. 3 PROGRAM EXECUTION MODULE

PROGRAM EXECUTION
MODULE MEMORY

FIG. 4

PROGRAM FILE

PROGRAMMABLE CONTROLLER HAVING A STORED PROGRAM WITH BOTH MACHINE LANGUAGE INSTRUCTIONS AND SOURCE CODE DATA

The field of the invention is programmable controllers such as those described in U.S. Pat. Nos. 3,810,118; 3,942,158; 4,165,534; and 4,442,504; and more particularly to storing and editing programs for operating the programmable controller.

BACKGROUND OF THE INVENTION

Programmable controllers are typically connected to industrial equipment, such as assembly lines and machine tools, to sequentially operate the equipment in accordance with a stored program. In programmable controllers such as those disclosed in the above cited patents, for example, the control program is stored in a memory and includes instructions which are read out in rapid sequence and interpreted to examine the condition of selected sensing devices on the controlled equipment, or to energize or deenergize selected operating devices on the controlled equipment contingent upon the status of one or more of the examined sensing devices.

The program execution processor for these controllers is designed to rapidly interpret programmable controller type instructions which in medium to large sized controllers include not only instructions that manipulated single-bit input and output data, but also arithmetic instructions, file handling instructions, timers and counters, sequencers and other, more complex instructions. Such instructions have become quite standardized in the industry and they may be directly associated with elements of a ladder diagram which is easily understood by control engineers. Program panels such as those disclosed in U.S. Pat. Nos. 3,798,612 and 3,813,649 and in U.S. Pat. No. 4,070,702 have been developed to assist the user in developing and editing ladder diagram type control programs comprised of such programmable controller instructions.

While ladder diagram control programs are particularly easy to create and edit for relatively small to medium scale control tasks, they become cumbersome and inefficient to use in large control tasks. Large ladder diagram control programs are difficult to understand, difficult to troubleshoot, and require a long time to execute.

U.S. Pat. No. 4,742,443 addresses this problem. The controller described therein includes a program execution processor which stores a plurality of separate ladder control programs that are logically related to each other by a stored structure chart program, and the processor is operable to interpret the stored structure chart program which directs which ones of the stored ladder programs are to be repeatedly interpreted by the processor at any point in time. It has been discovered that large control tasks can usually be broken down into separate control steps which are executed in a sequential order as the controlled machine or process advances through its states. Each control step is defined by a separately interpretable ladder program which is easy to understand and which may be executed at a very high scan rate. The sequence in which the separate control steps are interpreted is defined by the structure chart program which is a general expression of how the controlled machine or process is to operate. The user may thus define the general manner in which the machine or process is to operate using structure chart constructs, and then define the detailed operation of the machine or process in separate, easily managed ladder programs.

Heretofore the ladder diagrams were written in a relatively high level language for processing by an interpreter in the controller. The interpreter program in the program execution processor analyzed each ladder rung or a subpart of a rung and executed a machine language routine corresponding to the function defined by that part of the ladder. Because the ladder program was stored as a high level language, it could easily be recalled for editing on a terminal connected to the programmable controller. However, interpreters are relatively slow. As programmable controllers became more complex handling many more tasks and operating larger pieces of equipment, the ability of such interpreters to control the equipment and process the tasks in a timely fashion became a matter of concern.

One well known way of speeding up program execution is to compile the higher level language program into machine language instructions which can be executed directly by the processor. Compilers could be written to take the ladder diagram source code and generate a machine language object code version of the control program for the processor in the programmable controller to execute. A drawback to compiled programs is that the object code is not easily edited when changes are to be made to the controlled process. This drawback is even more significant in respect of programmable controllers as the equipment operator is not a skilled computer programmer. It is therefore advantageous to edit a source code version of the ladder control program. However, maintaining a copy of the source code in the programmable controller requires significant additional memory. Although the source code may be archived on a floppy disk or magnetic tape, such media are not always practical for storage and use in an manufacturing environment where dirt and magnetic fields may damage them.

An alternative approach is to decompile the stored object code to produce a version of the control program in a higher level language. Although some rungs of the ladder control program may be decompiled, not every compiled step may be reverse processed to produce the original rung of the ladder diagram. A complex section of a rung, such as an arithmetic computation, compiles into a number of machine language instructions. It is often very difficult, if not impossible, to examine a series of machine language instructions and resurrect the original section of the rung.

Even if the object code could be decompiled properly, editing previously had to be carried out when the particular program was not being executed by the programmable controller. With previous editing techniques, such as those shown in U.S. Pat. No. 3,813,649, the editing had to be performed either when the equipment being operated by the programmable controller was shut down or when another one of the ladder control programs was being interpreted. This not only placed severe restrictions on when the program could be edited, but also had adverse affects on the equipment operation.

SUMMARY OF THE INVENTION

A programmable controller system according to the present invention employs a compiler to generate machine language object code instructions from a source code control program written in a higher level language. A storage device is included in the controller which retains the object code program along with those portions of the source code which can not be easily reconstructed from the corresponding object code. A means is provided for regenerating the original source code from the object code and the stored portions of the source code. In order to conserve memory, the stored source code instructions may be represented by tokens.

The programmable controller may have a special purpose co-processor for executing a subset of object code instructions. Typically, the co-processor instructions in the subset have a one-to-one correspondence with instructions in the source code. Therefore, source code can be regenerated from the object code instructions in this subset. The remaining object code instructions are processed by a general purpose microprocessor and do not necessarily have a one-to-one correspondence with the high level source code instructions. Therefore these latter instructions can not be easily used to regenerate the source code instructions. The portions of the source code for the microprocessor instructions are stored along with the object code.

An object of the present invention is to provide a means for editing a compiled control program of a programmable controller without having to store the entire source code version of the control program.

Another object is to provide a mechanism for regenerating source code control program from the object code compiled therefrom.

A further object is to store only portions of the source code along with the corresponding portions of the object code in a manner which does not affect the speed at which the object code is executed by the programmable controller. This object is enhanced by storing a tokenized version of those portions of the source code so as to conserve storage space.

BRIEF DESCRIPTION OF THE DRAWINGS

In the drawings which illustrate an embodiment of the present invention.

DETAILED DESCRIPTION OF THE INVENTION

In order to describe the operation of the present program storage and editing technique, it is necessary to have an overview understanding of the hardware of the programmable controller system on which it can be employed. For a detailed description of such a system, reference should be made to U.S. Pat. No. 4,858,101 entitled "Programmable Controller with Parallel Processors". Although the instant invention is described in the context of its use on a particular type of programmable controller, it should be understood that the invention can be applied to other types of programmable controllers and to computers in general.

SYSTEM HARDWARE

Figure 1:
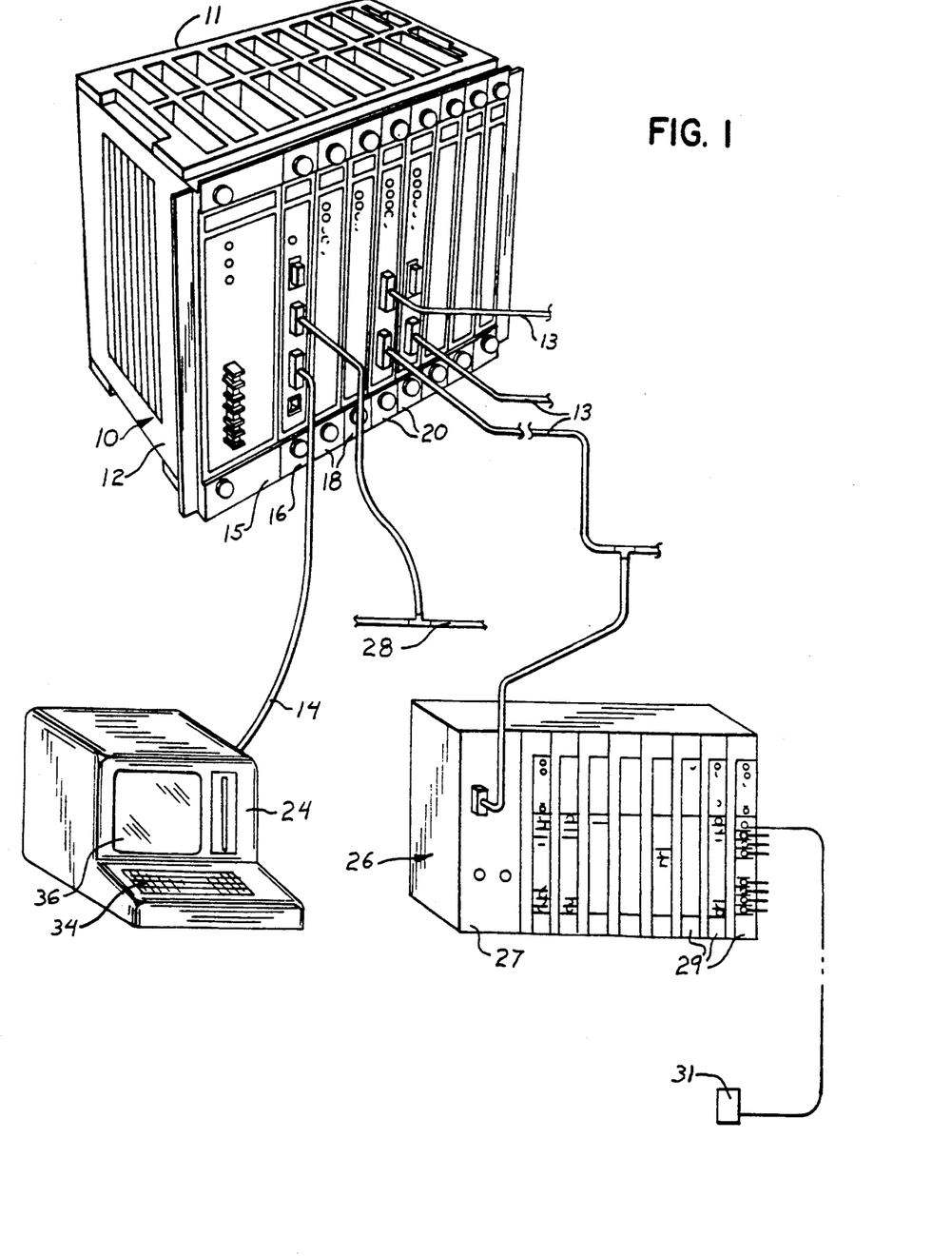
FIG. 1 is a perspective view of a programmable controller which incorporates the present invention.
Figure 2:
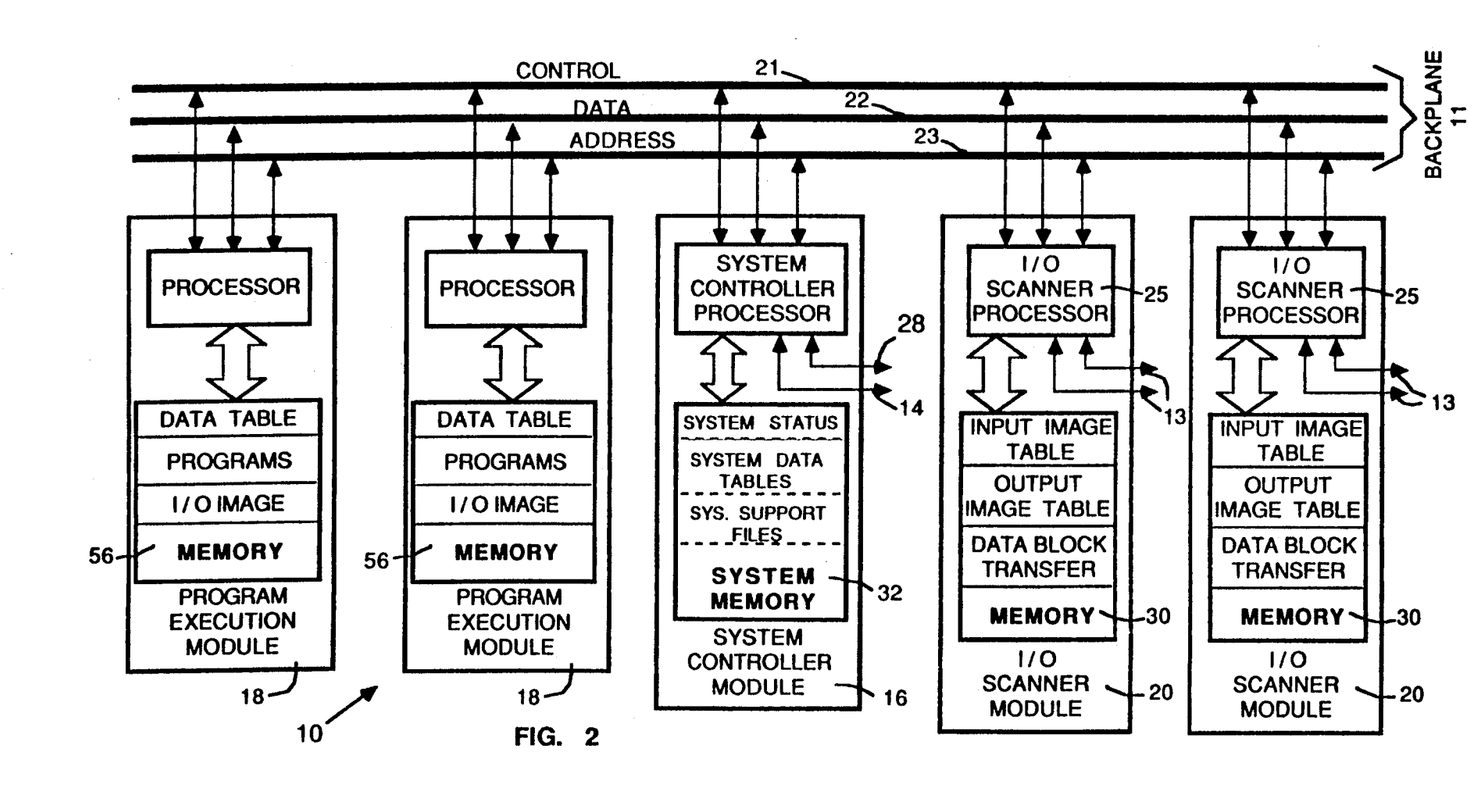
FIG. 2 is a schematic block diagram of the programmable controller components shown in FIG. 1.

With initial reference to FIGS. 1 and 2, a programmable controller 10 incorporating the present invention is housed in a rack 12 which includes a series of slots that receive a plurality of printed circuit board modules 15–20. These functional modules connect to a backplane 11 which extends along the rear surface of the rack 12. The backplane 11 has a plurality of module connectors which are interconnected by a conductive pattern on the backplane to provide a series of signal buses to which the modules 15–20 connect. The rack 12 contains a power supply module 15, a system controller module 16, a number of program execution modules 18 and a plurality of remote input/output (I/O) scanner modules 20, although only one program execution module and one scanner module are required. The remaining locations in rack 12 are empty and the slots are covered by blank plates until additional functional modules are to be inserted in these slots.

The system controller 16 supervises communication with a personal computer designated as terminal 24 and external devices connected to a local area network 28. Data may be exchanged over the local area network 28 with a host computer or a peer programmable controller, as well as other terminals. This enables the host computer to collect statistics from the programmable controller 10 regarding its operation, for example. Operational data is also displayed on the terminal 24 by the system controller so that the operator can monitor the system performance and detect faulty sensors or operating devices on the controlled equipment.

A significant task performed by the system controller 16 with respect to the present invention is supervising the programming of the programmable controller by a remote terminal. This activity involves generating and editing the programs which direct operation of the controlled equipment. These programs can be enhanced versions of conventional process control function charts and ladder type control programs which specify the operations for each step of the function chart. The various programs are developed on a terminal that is either connected directly to the programmable controller 10, such as terminal 24, or via the local area network 28. The programs are then compiled and downloaded into the programmable controller 10 where the system controller 16 routes the program for storage in the program execution module 18 that will execute the program. Programs can be similarly downloaded from a host computer over the local area network 28.

The system controller 16 also routes commands for editing of programs that were previously stored in the program execution modules 18. The editing typically involves adding, deleting and changing portions of the control program. Portions of the control program are uploaded into the terminal 24 where the changes are made. The changed portions then are compiled and downloaded into the programmable controller. The changes are routed by the system controller 16 to the corresponding program execution module 18 where a software routine enters the changed portions in the stored control program. This editing process will be described in detail hereinafter.

In addition to providing a communication interface for the programmable controller 10 to external terminals and local area networks, the system controller 16 also performs system housekeeping functions, such as providing an indication of the system status and supervising intermodule communication via the backplane 11.

As noted above, the control programs are stored in and executed by different ones of the program execution modules 18. Each of these modules may simultaneously execute specific ones of the control programs. During this execution, the processor modules 18 read the state of the sensing devices from input image table in the memory 30 of the various I/O scanner modules 20, and write output state data from its memory to the output image tables in the I/O scanner modules.

Figure 3:
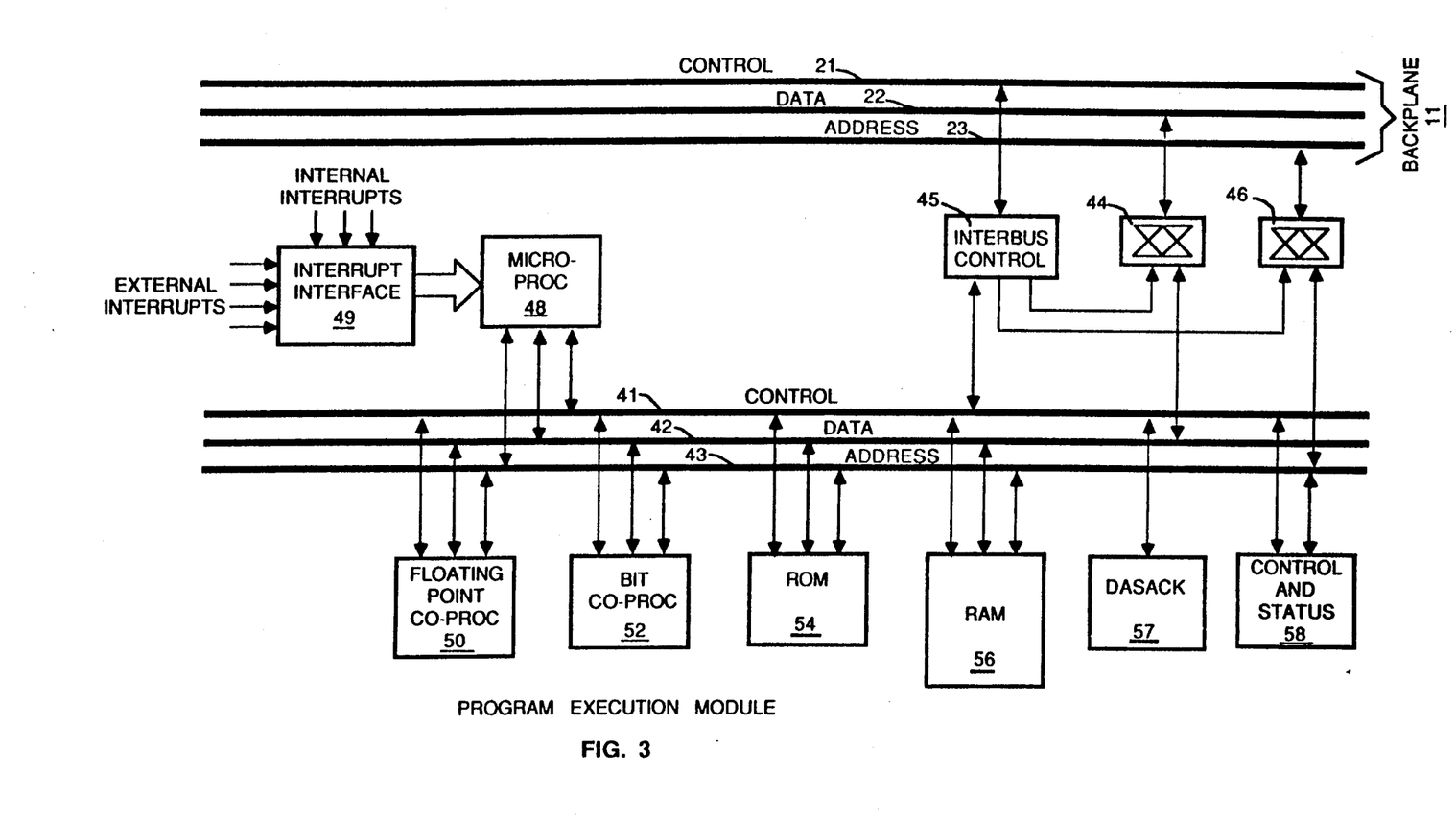
FIG. 3 is a schematic block diagram of one of the program execution modules of the programmable controller shown in FIG. 2.

One of the program execution modules 18 which executes the control programs is shown schematically in FIG. 3. Each program execution module 18 has a set of internal buses 41-43 coupled to the backplane 11. Specifically the program execution module 18 has a thirty-two bit internal data bus 42, a set control lines 41 and an address bus 43. These are coupled to the backplane data and address buses 22 and 23 by respective sets of tri-state, bidirectional transmission gates 44 and 46. The operation of these sets of gates is governed by an interbus control circuit 45 coupled to backplane control lines 21 and module control lines 41. The interbus control circuit 45 responds to signals on the internal control bus 41 indicating that the program execution module seeks access to the backplane 11. A backplane access request is then sent by the interbus control circuit 45 to the system control 16 via backplane control lines 21. When it receives a signal one of the backplane control lines granting such access, the interbus control circuit causes the sets of transmission gates 44 and 46 to couple the internal modules buses 42 and 43 to the backplane 11. When another module, such as the system controller 16, sends data to the program execution module 18, the interbus control circuit will receive a signal on the backplane control lines 21 directing it to couple the buses 42 and 43 to the backplane data and address buses 22 and 23.

The remaining components of the program execution module are connected only to the internal module buses 41-43. The internal bus system is built around a microprocessor 48, which may comprise a thirty-two bit Motorola 68020 microprocessor. The microprocessor 48 has an interrupt port which is coupled to an interrupt interface circuit 49. This interface circuit receives signals from four external interrupt lines connected to terminals on the front of the program execution module 18. These external interrupt lines permit devices which sense high priority events to be coupled directly to the program execution module for fast response. Three other interrupt lines connect circuits within the module to the interface circuit 49. A signal on one of the external or internal interrupt lines causes the microprocessor 48 to immediately interrupt the module's normal program execution and execute a routine that corresponds to that interrupt signal.

The processing capability of the program execution module 18 is also supported by a floating point co-processor 50 and a bit co-processor 52. The floating point co-processor is commercially available from Motorola, Inc. as the 68881 integrated circuit, which is specifically designed to work with the 68020 microprocessor 48 in performing arithmetic operations. The bit co-processor 52 is a custom integrated circuit for carrying out Boolean logic operations on individual bits of the data words and for performing high speed data movement. Bit co-processors have been used in programmable controllers in the past to execute different sub-sets of ladder program instructions using hardwired logic, as described in co-pending U.S. Pat. No. 4,742,443 entitled "Programmable Controller with Function Chart Interpreter".

The three processor devices 48, 50 and 52 operate in tandem to execute specific types of instructions included in the control program. The microprocessor 48 may begin execution of the ladder control program and when it encounters a floating point arithmetic function, the floating point co-processor 50 is enabled and the operands are transferred to it from the microprocessor. The floating point co-processor 50 takes over the processing function until the arithmetic operation is complete at which time the microprocessor 48 resumes program execution. If the rung of the ladder control program calls for bit processing (i.e. contains an instruction in the sub-set for the bit co-processor 52), the microprocessor 48 immediately relinquishes control to the bit co-processor 52 by writing the address of the ladder program instruction into a program counter in the bit co-processor. The bit co-processor 52 then assumes control of the processing activity and executes the subsequent ladder program instructions until a stop instruction is encountered at the end of the bit processing section of the program. At this point, the bit co-processor 52 signals the microprocessor 48 via the control bus 41 to resume control of the control program execution. Approximately 85-90 percent of a typical ladder control program may be executed by the bit co-processor 52.

The program execution module 18 further includes a data size acknowledge (DASACK) circuit 57 which provides an indication on two of the control bus lines 41 as to whether the width of the data on the data bus 42 is a long word consisting of 32 bits, a regular sixteen bit word or a single eight bit byte. This data size information is used by various module components in their data processing. Another component of the program execution module 18 is a control and status circuit 58 which monitors the status of the program execution module and provides proper control signals on lines of the control bus 41 to enable various components in a conventional manner. For example, this circuit provides control signals to the RAM 56 during read and write operations.

Both a read only memory 54 and a random access memory 56 are connected to the three internal buses 41-43 of the program execution module 18. The ROM 54 contains run time library routines and constants for the three processors 48, 50, and 52. The user defined programs to be executed by the particular module 18 are stored in its RAM 56. The RAM 56 also provides storage for the operands and the results of the various computations performed by the program execution module.

Figure 4:
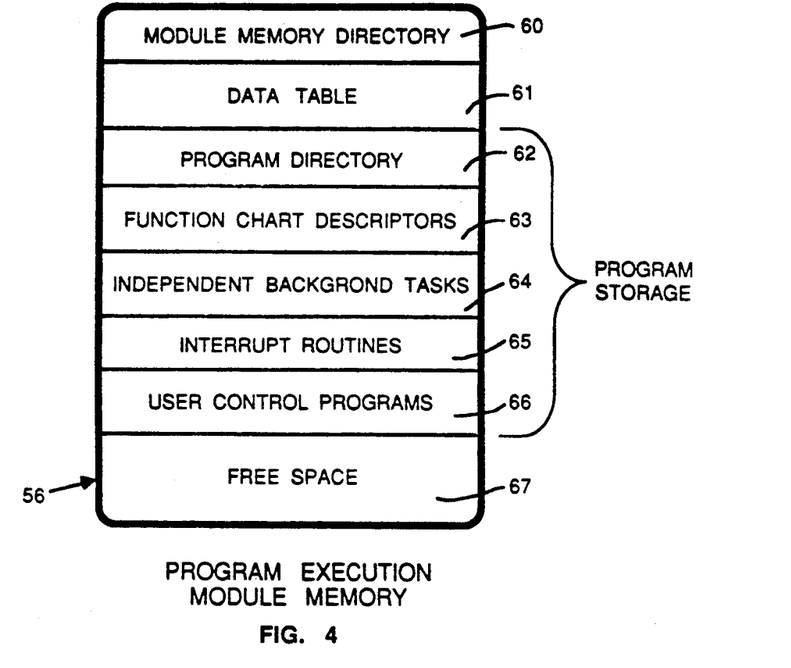
FIG. 4 is a conceptual diagram of the program execution module's memory data structure.

FIG. 4 represents the generalized data structure of the RAM 56 for each program execution processor 18. The RAM includes a directory section 60 which contains pointers to the other sections of the RAM. The program execution module 18 contains its own data table 61 which includes storage locations for various counters, timers and intermediate computation values.

A significant portion of the program execution module RAM 56 is devoted to program storage. These programs include compiled control programs, independent background tasks and various interrupt routines to be processed by the particular module 18. A directory 62 of the different programs is provided. In order to properly carry out the control task, support files containing the function chart descriptors specifying the order of the control program execution, are contained within area 63. Sections of the module's RAM 56 are designated for storing independent background programs 64, interrupt routines 65 and user control programs 66. Following the section for the user control programs 66, is free space 67.

The program execution module 18 thus described exchanges data with the remote I/O racks 26 by means of the I/O scanner modules 20. As shown in FIGS. 1 and 2, the I/O scanner modules 20 couple the programmable controller 10 to remote input/output racks 26 via a serial data links 13 (only one remote I/O rack 26 is shown). The remote I/O rack 26 contains individual interface modules 29 to which are connected the sensors 31 and operating devices on the controlled equipment. The remote I/O rack 26 is of a conventional design and its modules 29 may include AC or DC input and output modules. The remote I/O rack 26 includes a standard communication adapter 27 employing conventional communication techniques to exchange data over the serial data link 13. U.S. Pat. No. 4,413,319 describes such a remote rack 26 and its communication which the I/O scanner module 20.

The I/O scanner modules 20, under the control of an internal processor section 25, periodically request sensor input data from the corresponding remote I/O rack 26. These sensor data are stored in an input image data table located in the I/O scanner module's memory 30. Each I/O scanner module 20 connects to the backplane buses 21-23 so that the program execution modules 18 can directly access the input image data table of the I/O scanner modules. As described in U.S. Pat. No. 4,413,319, certain types of sensors provide blocks of data to the programmable controller 10. A section of memory 30 is designated to store such transferred blocks of data. The I/O scanner modules 20 are physically configured so that the data access by the program execution modules 18 has minimal adverse impact on the gathering of data from the remote I/O racks 26.

The program execution modules 18 also access the memories 30 of the I/O scanner modules 20 to store output state data for the operating devices on the controlled equipment. These data are stored in an output image table in the memory 30. At regular intervals, the updated data in the scanner module's output image table are transferred to the respective remote rack 26 to operate the actuators connected to these remote racks.

PROGRAM FORMULATION AND EXECUTION

The programmable controller 10 thus described executes several types of user defined programs: control programs, independent background programs, interrupt routines and fault routines. Various ones of these programs are assigned to each program execution module 18 for processing. The independent background tasks are user programs that are subordinate in execution to control programs and may be used for lengthy non-time critical operations, such as performance reporting. Interrupt routines allow high priority operations to be executed upon the occurrence of a given event, while fault routines permit a graceful recovery from an error condition.

The control programs for operating the controlled equipment comprise a sequential function chart and a set of user control programs. The function chart is reduced to a set of descriptor files similar to those described in U.S. Pat. No. 4,742,443. The source data for the function chart is retained so that it can be edited, if necessary. Each descriptor file corresponds to a step in the function chart and specifies one of the user control programs to carry out the function of that step. Conventional techniques are employed to store and edit these descriptor files. The user control programs are typically conventional ladder programs. However, because the programmable controller executes compiled versions of the user control programs, other computer languages, such as BASIC, may be employed to generate the source code for this type of program.

As noted previously, the controller system 10 may be programmed via a programming terminal 24 connected directly to the system controller module 16, or via a personal computer or host computer connected on the local area network 28. These terminals and computers contain the necessary programs to author the function chart and ladder type control programs. The programmer graphically constructs the function chart on the screen of a computer terminal. The software and techniques for generating the function chart are similar to that practiced with previous programmable controllers.

Figure 5:
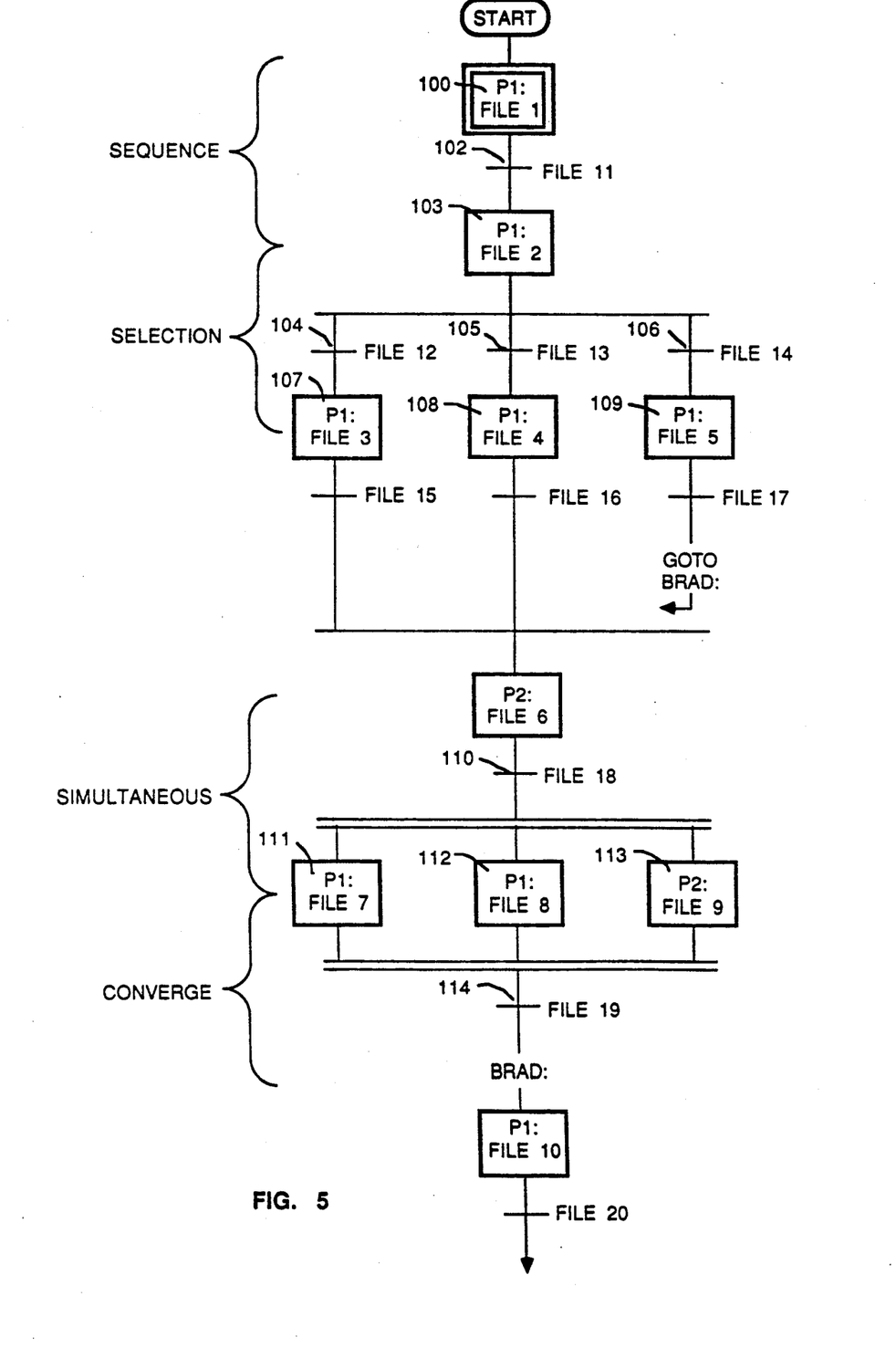
FIG. 5 is an exemplary process control function chart.

FIG. 5 illustrates an example of a function chart as it would be displayed on the programming terminal 24. Each step of the function chart, such as step 100, is represented by a rectangular box. The initial step of the function chart, i.e. step 100, is indicated by a double box. Within each box is a designation of the program execution module 18 (e.g. P1 or P2) that is to perform the function of the step. The first step 100 indicates that the program execution module designated P1 will execute that step. Also contained within the box is a designation of the file number in the program execution module's memory 56 that contains the control program for that step. For example, the control program for step 100 is in file 1.

Each step in the function chart is followed by a transition, such as transition 102. The transition specifies a condition upon the occurrence of which the preceding step terminates. The transition may be defined by a ladder program having a single rung. The transaction is stored in a separate file, such as file 11 for transition 102.

The exemplary function chart of FIG. 5 contains several different sections referred to herein as "constructs". The first construct is a sequence type and consists of process steps 100 and 103 and transition 102. The steps in this construct are executed sequentially. Following step 103 is a selection construct which consists of two or more program branches, in this case three branches, containing steps 107-109. Only one of the branches is selected for execution depending upon which one of the entrance transitions 104-106 occurs first. A similar set of program branches is contained in the simultaneous construct farther down the function chart. However, when the simultaneous construct's transition condition 110 occurs, the steps 111-113 in all of the branches are executed in unison. Note that different ones of these simultaneous branches are executed on different program execution modules 18. This simultaneous execution is terminated upon the occurrence of a transition 114 in a converge construct.

The function chart per se does not get executed by the programmable controller. It is used, however, by the programmer and the programming software to assemble a set of data files for each of the program execution modules 18. Specifically, the function chart is reduced by the programming software in terminal 24 to a series of descriptor files that describe the activity of various portions of the function chart. Each descriptor file identifies the user control program (e.g. a ladder program) for a step in the function chart, the associated termination transition, and identification of the descriptor (and its program execution module) that is to be executed following the completion of that function chart step. These descriptor files and the corresponding control program and transition files are then downloaded into the RAM 56 of the designated program execution module 18. The descriptor files are used by the function chart interpreter program in each program execution module 18 to control when each such module executes a given control program and which transition determines when the control program is complete.

When a program execution module completes a function chart step, it either begins executing the next one, or if the step is to be executed on another module, a command is sent via the backplane 11 to the program execution module 18 containing the control program for the next step. The command identifies the descriptor file for the next step and instructs that program execution module 18 to begin executing it.

The present invention relates to how the user control program is compiled, stored in the execution module's memory, and edited. Although the present invention is applicable to a variety of compiled programs, it will be described in terms of a ladder type control program. As noted previously each of the program execution modules 18 has its own RAM 56 which contains the ladder programs that have been designated for execution on that module. The ladder programs for each execution module 18 may be written in an on-line mode via the terminal 24, which is connected by cable 14 to the programmable controller 10, or in an off-line mode utilizing an authoring system on a stand alone computer. The terminal 24, which is typically a personal computer, or the stand alone computer incorporates the necessary software for preparing the ladder diagram and compiling it into a series of machine language instructions in a program file. The compiled program file is then transfer to and stored in the designated program execution module 18.

Figure 6:
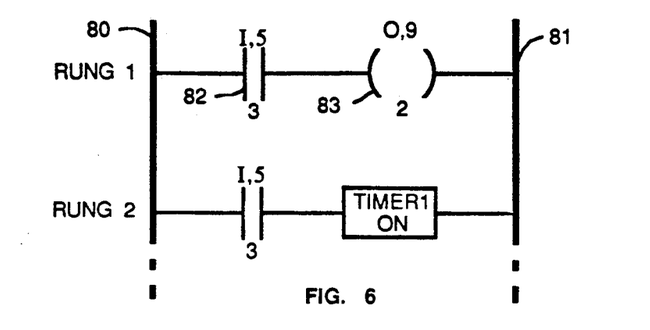
FIG. 6 is an exemplary ladder diagram type control program as displayed on the terminal of FIG. 1.

Two rungs of an exemplary ladder diagram as they would be generated on terminal keyboard 34 by the operator and displayed on the CRT screen 36 of terminal 24 is shown in FIG. 6. The symbols for the various operations of the controlled equipment and the method of forming the ladder diagram appear to the operator to be identical as those for previous programmable controllers. As per convention, the two power rails are designated by vertical lines 80 and 81 on opposite sides of the screen. Between the two power rails 80 and 81, the operator forms the horizontal rungs of the ladder diagram. Each rung represents the sensor conditions that are to be tested and the operating devices to be activated or other operations to be carried out for that part of the control program. For example, the first rung specifies that if the switch represented by symbol 82 is closed, the operating device designated by symbol 83 will be turned on. Specifically, symbol 82 indicates that the third bit of the fifth data word in the input image table contains the state of the switch to be tested and if that bit is set, i.e. at a high logic level, the rung is found to be true. This bit represents the state of an input sensor, such as device 31 on FIG. 1. The truth of the rung is indicated by a flag in RAM 56. Symbol 83 indicates that if the rung is found to be true, bit 2 of the ninth data word in the output image table is to be set, i.e. changed to a high logic level, thereby turning on the corresponding operating device. If rung one is found to be false, that is the designated input bit is not set indicating that the sensor switch is open, the corresponding operating device on the controlled equipment will be turned off by resetting its bit in the output image table word to zero. As described above the words of the input and output image tables are stored in the memory 30 of the scanner modules 20. Rung 2 is similarly drawn and controls the operation of a timer in the programmable controller.

After the operator has constructed the ladder diagram, it is compiled in the terminal 24 to produce a program file of machine language instructions for the programmable controller 10. Each of the program files has the structure shown in FIG. 7. The first area 70 of the program file contains a file header which includes a verification word that is based on the program file number. The file header also includes a status word which indicates whether the file has been edited, whether the program is scheduled for execution and whether it is currently executing. The header also identifies the type of program. Pointers are also included in the file header to the starting address of the other program file areas. Following the file header is an area containing the program instructions for the program execution module 18. The program instruction area is subdivided into sections that contain the object code instructions for each rung of the ladder control program. The rung sections are stored sequentially in the order of execution. Next, the program file contains a rung directory 75 which indicates the number of rungs in the ladder program from which the program instructions were compiled and holds data related to each rung. For each rung, the directory 75 contains the current number of the rung, a flag indicating whether the rung has been inserted, deleted or altered and if so, the original number of the rung prior to the editing. The entry for each rung also provides an offset of the number of words from the start of the program file to the beginning of the rung. This offset enables the editing program to locate the instructions for a given rung. Following the rung directory in the program file is a table 76 containing the instruction labels and their location within the program.

When the first rung of the ladder diagram in FIG. 6 is compiled, all of its operations are represented by instructions for the bit co-processor 52. The assembly language mnemonic instructions for each of the object code instructions are:

| | |
|---|---|
| SOR | [offset] |
| XIC.I | 5, 3 |
| OTE.I | 9, 2 |

The first instruction for every rung is a start of rung command SOR. The instruction includes an offset which indicates the number of words from the start of rung instruction to the first output instruction, in this case, the third instruction OTE.I. The output offset is used in more complex rungs having numerous input sensors that are examined. In such a complex rung, if any one of the inputs is found to be false, the offset is then used to jump immediately to the first output instruction bypassing any intervening inputs which are to be tested. This use of the offset speeds up the execution of the rung, since if any one of the inputs is false, the entire rung is false and the output state can be immediately determined.

The next assembly language instruction for the first rung is XIC.I which, in control terminology, designates that an input sensor switch is to be examined for a closed condition. The first number in the second instruction is an offset of the number of entries in the input image data table to the word which contains the bit which indicates the state of the input switch. In this case, the offset is one indicating that the fifth word contains the bit to examine. The input word offset also indicates the I/O scanner module 20 in which this input word is stored. The final number of the second assembly language instruction (i.e. 3) designates the bit of the input word to be tested.

The third instruction for the first rung is an output command OTE.I which includes an offset pointing to the output word that contains the bit to be set if the rung is true or cleared if the rung is false. In this case the offset points to the ninth word in the output image data table and indicates that its second bit is to be affected by the truth of rung 1. The numerical portion of the output instruction also enables the operating system to determine the I/O scanner module 20 that contains the output data word.

Figure 7:
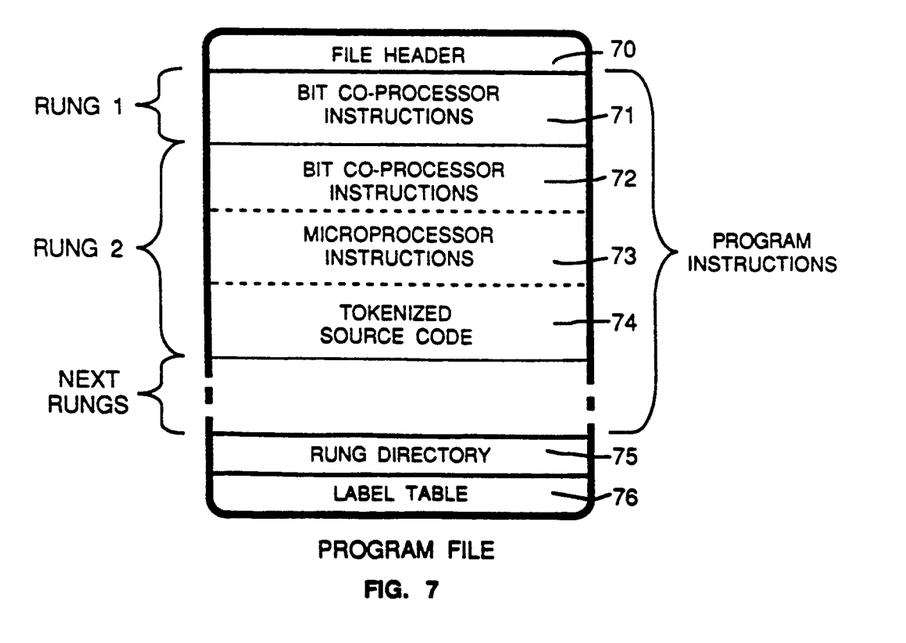
FIG. 7 represents the program memory file for a typical ladder type control program.

After the first rung is compiled, the instructions are stored in the corresponding rung section 71 of the program file as shown in FIG. 7. As rung 1 may be entirely represented by bit co-processor instructions, its program file section 71 does not contain any instructions for other processors or a tokenized version of the source code.

The second rung on the ladder diagram of FIG. 6 cannot be executed entirely by the bit co-processor 52. For this rung, the bit co-processor 52 examines the third bit of the fifth word of the input data table and the microprocessor 48 activates the first timer if that bit is set. The assembly language mnemonic instructions for carrying out the function defined by rung 2 are:

| (1)  | SOR    | [offset]           |
|------|--------|--------------------|
| (2)  | XIC.I  | 5, 3               |
| (3)  | STP    | [offset]           |
| (4)  | MOVE.L | Timer Address,-(a7)|
| (5)  | JSR    | TIMER 1            |
| (6)  | MOVE.L | [offset],(a2)      |
| (7)  | MOVE.L | (a2),a0            |
| (8)  | JMP    | (a0)               |
| (9)  | dw     | 2117               |
| (10) | dl     | [Timer Address]    |
| (11) | dw     | 16352              |

The assembly language instructions for this rung have been abbreviated to simplify the description. The Appendix contains a complete listing of the assembly language instructions and the corresponding object code for rung 2.

As noted previously, each of the rung sections of the program starts off with an assembly language instruction SOR indicating the start of the rung and the offset to the first output instruction, which in this case points to the address of the third instruction. The second instruction designating an input sensor switch bit to examine, which in this example is the same as the second instruction in rung 1. However, the rung's output function of turning on the first timer is not an operation that can be carried out by the bit co-processor 52. Therefore, the third instruction for rung 2 is STP which designates that the bit co-processor 52 is to stop and execution of the program is to be transferred to the microprocessor 48. This instruction causes the bit co-processor 52 to enter a dormant state after signaling the microprocessor 48 to begin executing the next instruction. The offset associated with the STP instruction points to the beginning of the part of the program file that contains the tokenized source code. This offset is not used during the course of program execution but is used by the program editor to skip over the intervening object code instructions for microprocessor 48 to the tokenized version of the source code for those instructions when reconstructing the ladder diagram.

With continuing reference to FIG. 3, instructions (4)–(8) are executed by the microprocessor 48 to turn on the first timer if the rung is true. The timer function is performed by a run time library routine stored in ROM 54. This routine when activated periodically increments the value stored in an address of RAM 56. The fourth instruction is a "long move" which saves the RAM address to be incremented for Timer 1 on the "stack" of the program execution module 18. The fifth instruction for rung 2 calls the timer routine, and activates Timer 1 if the rung is true or resets the timer if the rung is false. The timer routine gets the timer value's RAM address off of the stack and begins to periodically increment that address contents.

Instructions (6)–(8) are a fixed set of commands that are used at the end of each set of microprocessor instructions to return the execution to the bit co-processor 52. As the first instruction of every rung, SOR, is a bit co-processor instruction, the co-processor 52 must be reactivated at the end of the executable code in each section of the program file. Alternatively, if rung 2 was more complex and had a bit co-processor instruction to the right of the Timer 1 box in FIG. 6, additional bit co-processor instructions would be present in the rung's file after instruction (11). In this case, the set of instructions (6)–(8) would direct the bit co-processor 52 to "wake up" and begin executing those instructions rather than the next rung.

At instruction (6) for the second rung, the offset to the next Boolean bit logic instruction is loaded into the program counter of the co-processor 52. When this occurs, the bit co-processor 52 wakes up and a control signal is automatically sent to the microprocessor 48 directing it to enter a dormant state. The bit co-processor 52 continues by executing the next rung until another STP instruction is encountered. At that point, the microprocessor 48 wakes up. Even though the bit co-processor 52 has executed instructions in the program file well beyond instruction (7), the program counter in the microprocessor 48 still contains the address of instruction (7) which it contained when the microprocessor entered the dormant state. At instruction (7), the microprocessor 48 obtains the current value of the bit co-processor program counter and then jumps to that location in the program at instruction (8). Thus, the microprocessor 48 picks up the execution where the bit co-processor 52 left off later on in the control program.

As noted previously, each bit co-processor instruction has a one-to-one correspondence with the source code instruction from which it was generated. As a result, these instructions can be easily decompiled to produce the corresponding source code when the program is subsequently edited. However, the microprocessor instructions typically perform complex mathematical or logical operations. Therefore, a series of microprocessor instructions may correspond to a single source code instruction. As a consequence, in order to facilitate reconstructing the source code from the object code, data regarding the source code for the microprocessor instructions are generated by the compiler and stored in the program file rung sections following each group of microprocessor instructions.

Program instruction lines (9)-(11) represent a tokenized version of the source code for the set of instructions that is executed by the microprocessor 48, in this example the timer section of rung 2. These lines are not executed by the program execution module. Program line (9) indicates that the rung contained a timer output instruction and line (10) designates the RAM address of the value for Timer 1. Program line (11) is a fixed instruction that designates the end of the tokenized source code. As will be described in detail later, these three lines are used by the program editor to reconstruct the source code and the graphical representation of the rung.

FIG. 7 illustrates how the rung sections for the exemplary ladder program are stored in a program file. The section 71 of the program file for the first rung consists entirely of bit co-processor instructions as described above. The program file section for the second rung consists of three portions 72-74. The first portion 72 contains the bit co-processor instructions (instructions 1-3). The second portion 73 represents the instructions for the microprocessor 48 (instructions 4-8) and the third portion 74 contains the tokenized source code for the microprocessor instructions (instructions 9-11). The organization of the second rung section of the program file corresponds to the order in which the various instructions were compiled from the ladder diagram.

Once the entire ladder diagram has been compiled and the program file has been composed in the terminal 24, the program file is downloaded into the RAM 56 of the program execution module 18 that has been designated to execute it. At this time, the program directory 62 (FIG. 4) in the RAM 56 is updated to refer to the downloaded program.

The present invention stores a tokenized version of the source code for the object code instructions which cannot be decompiled to reproduce the original ladder diagram rung for editing purposes. That is, those object code instructions which could be interpreted by a decompiler a number of ways to produce the graphical symbols for the rung. In particular, as previously noted, the machine language instructions for the bit co-processor 52 have a one-to-one correspondence with the symbols used in the ladder diagram rung. Therefore, these instructions do not require any tokenized version to be stored but rather can be interpreted directly by the decompiler to produce the corresponding portion of a ladder rung. However, complex arithmetic and output operations of a ladder rung which are to be performed by either the microprocessor 48 or the floating point co-processor 50 require tokenized versions of the source code to be stored in the program file in order for the decompiler to recreate that portion of the ladder diagram rung. During compilation of the source code, the compiler inserts jump instructions which causes the execution of the object code to skip over that portion of the program file for the rung that contains the tokenized source code. This permits the tokenized source code for each rung to be stored adjacent to the machine language instructions for the rung, which facilitates editing of the compiled program.

PROGRAM EDITING

When a previously compiled ladder program is to be edited, the operator uses terminal 24 to address the particular program execution module 18 which contains the ladder program that is to be changed. The file containing the ladder program is then uploaded from the program execution module through the system controller 16 to the terminal 24. A decompiler program within the editor software package in the terminal then processes the uploaded program to produce a source code version of the ladder program which is displayed as a conventional ladder diagram on the CRT screen 36 of the terminal 24.

The operator is then given the opportunity to edit the ladder diagram on a rung-by-rung basis. Specifically, the operator using the terminal keyboard 34 may alter an existing rung, add a new one or delete an old rung. Once the editing of each rung is complete, it is compiled in the terminal 24 to produce the corresponding set of machine language instructions. This instruction set is then downloaded into the programmable controller 10 where it is inserted into the program file in the program execution module's memory 56 (FIG. 4).

The editing process will be described in detail with initial reference to the flow chart of FIG. 10 and the block diagrams of FIGS. 2 and 3. At step 120, the operator of the programmable controller 10 selects the program file for display on the terminal 24 by entering the file designation via keyboard 34. Although this file can be an independent background task or an interrupt routine, the editing process will be described in terms of one of the ladder type user control programs. After the program file has been selected, the terminal 24 sends a request to the programmable controller 10 at step 122 identifying the program file number and the program execution module 18 on which the program is stored.

In response to the request, the system controller 16 sends a command to the designated program execution module 18 instructing it to send part of the file to the terminal 24. Next at step 126, the program instructions for several rungs of the ladder diagram are uploaded from the program execution module 18 to the programming terminal 24. The number of rungs uploaded is a function of the amount that can be simultaneously displayed on the CRT screen 36 of the terminal 24. For each rung, only the bit co-processor instructions and tokenized source code are sent to the terminal. During the uploading, the program execution module's software converts physical addresses in the instructions into logical addresses. The uploaded instructions are stored in a memory within the terminal 24.

At step 128, the software within the terminal 24 decompiles the instructions to produce the source code instructions and a graphical representation of each rung on the CRT screen 36. With reference to the program file shown in FIG. 7, the decompilation begins with the bit co-processor instructions for the first rung. As these object code instructions have a one-to-one correspondence with a source code instruction and its ladder diagram symbol, the decompiler software examines each one and inserts the corresponding symbol on the display line of the screen for that rung. For example, when the decompiler encounters a SOR instruction, it begins displaying a new rung on the screen. The instructions for the symbols of rung 1 of the exemplary ladder diagram in FIG. 6 are XIC.I and OTE.I as described above. The XIC.I instruction corresponds to the input switch symbol and OTE.I corresponds to the output symbol.

When the program instructions for a rung that contains bit co-processor and microprocessor instructions is encountered, such as rung 2, a different decompilation method is employed. For example, with reference to FIGS. 6 and 7 and the mnemonic instructions listed above, rung 2 contains the XIC.I bit co-processor instruction representing the examination of an input switch state. This instruction can be directly decompiled to produce the corresponding source code and graphic symbol. However, the output section of rung 2, which turns on Timer 1, is represented by several microprocessor instructions. At the end of the bit co-processor instructions, in the section of the program file for rung 2, is the stop bit co-processor instruction, STP. When the decompiler software in the terminal 24 encounters this instruction, it recognizes that the next section of instructions from the programmable controller are tokenized versions of the source code instructions. (Note that the microprocessor object code is not uploaded into the terminal.) As a result, the decompiler software branches to a routine that interprets the tokenized source code to generate the original source code and the corresponding graphic symbols for display on the terminal's screen. This decompilation continues a rung at a time until all of the uploaded program instructions have been converted to source code and displayed.

Once the group of the ladder diagram rungs have been displayed on the terminal 24, either one of the rungs can be selected for editing or the operator can use the keyboard 34 to scroll through the ladder diagram to reach the location for editing. If at step 130 the operator chooses to scroll through the program, a command is sent to the programmable controller 10, at step 132 to obtain the program instructions for the next rung from the program execution module 18. The process then returns to step 126 where the object code instructions for this rung are uploaded and then decompiled at step 128.

Figure 8:
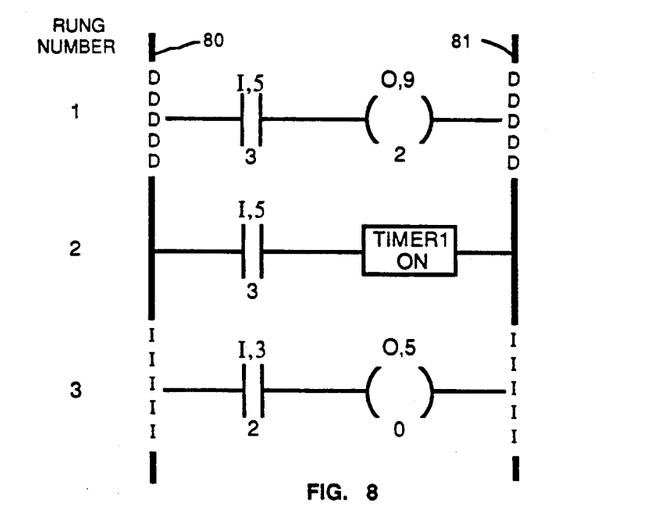
FIG. 8 illustrates an edited ladder type control program as it would appear on the screen of a programming terminal.
Figure 9:
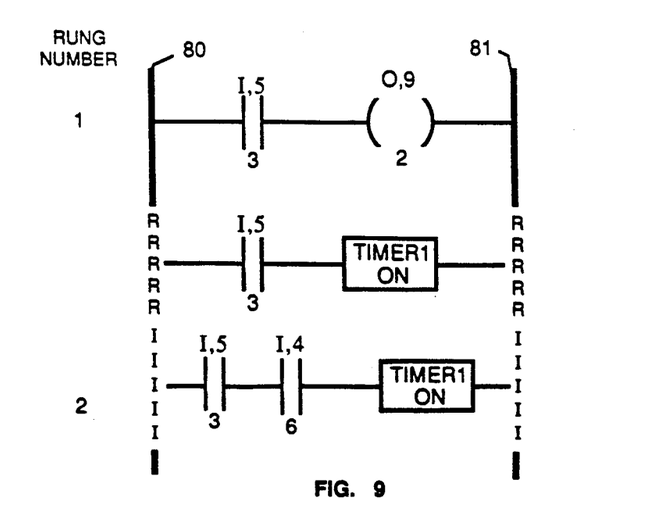
FIG. 9 illustrates another version of an edited ladder type control program.

When the operator selects the portion of the ladder diagram where the edit will occur, by placing the terminal's cursor at that spot and pressing the appropriate key, the process advances to step 133. At this point, a request is sent to the programmable controller seeking access to its editing resource. As several programming devices can attempt to edit programs on the programmable controller 10 at the same time, the check by the system controller 16 insures that only one device at a time has access to the editing resource. Once the resource is allocated to the terminal 24, the editing procedure advances to step 134. The ladder diagram is then edited on the terminal 24 in a manner similar to that used with previous programmable controllers. The cursor can be used to delete a rung, change an existing rung or add an entirely new one. FIGS. 8 and 9 illustrate modified versions of the ladder diagram of FIG. 6 incorporating all three types of changes.

The topmost rung in FIG. 8 corresponds to rung 1 in FIG. 6 and has been marked for deletion, as indicated by the letter D's along the power rails 80 and 81. The editing process is carried out on a rung-by-rung basis, so that once the rung had been marked for deletion, a command is sent to the editing routine in the corresponding program execution module 18 at step 138. The editing routine in this module removes this rung's instructions from the program file in the RAM 56. The subsequent rungs in the program file are then moved up to fill in the gap created by the deletion. The first alteration of a program file causes a flag to be set in the file header indicating that an edit had been made. The rung directory 75 in the program file (FIG. 7) is then updated. The label table 76 in the program file is also adjusted if required as a result of the edit. Alternatively, the actual removal of the rung could occur at the end of the entire editing process which allows the operator to undo previous edits.

The middle rung of FIG. 8 corresponds to an unchanged version of rung 2 in FIG. 6. As it is unchanged, it is not bracketed by letters along the power rails 80 and 81. The bottom rung illustrated on FIG. 8 has been inserted by the editing process. This rung is graphically constructed on the terminal 24 in a manner similar to the construction of the original ladder diagram. An inserted rung is designated by the letter I appearing along the power rails 80 and 81. When the new rung is in final form, the operator instructs the editing software in the terminal 24 to compile the rung at step 136. After the compilation in the terminal 24, a command is sent to the programmable controller 10 step 138, designating the program execution module 18, the program file, new rung number and size of the new rung. In response to this command, the editing task in the module 18 opens a gap at the proper location in the edit area of its RAM 56 in which to store the new rung. At this time the rung directory 75 and label table 76 are update with addresses for the gapped file. Specifically, the rungs are renumbered so that the new rung numbers represent the current order of the rungs. The status field of the rung directory entry for the new rung indicates that it is an inserted rung. The machine language instructions and tokenized source code are then downloaded (written) into this gap. In addition, any data required by the new rung, such as preset values for a timer or a counter in the rung, are downloaded into the data table 61 in RAM 56. At the completion of the download, a GAP COMPLETE message is sent by the terminal 24 to the programmable controller 10.

FIG. 9 illustrates the terminal display when an existing rung is changed. Both the original and new versions of the rung appear. As shown, rung 2 of FIG. 6 has been edited to include the examination of a second sensor switch. When a rung is selected on the terminal for changing, a duplicate is displayed immediately below it in the ladder diagram and the alterations are made on the duplicate rung. The original version of the rung is bracketed by the letter R indicating that it is being replaced and the new version is bracketed by the letter I designated that the rung will be inserted in place of the old one.

When the changes to the rung are complete, it is compiled into bit co-processor, microprocessor, and tokenized source code as for the inserted rung described above. A change rung command is sent to the proper program execution module 18 via the system controller 16. This command designates the program execution module and the program file number in which the editing will take place. The rung number and the size of the edited version are also sent with the command. In response to the change rung command, the editing routine in the program execution module increases or decreases the memory space for the rung by a conventional gap or ungap technique in order to accommodate the size of the edited rung. The rung directory and label table are also adjusted. The instructions and tokenized source code for the altered rung are then downloaded into RAM 56 in the designated program execution module at step 138 replacing the instructions for the original rung. Any required data table entries are made at this time as well. After all of the rung instruction code has been downloaded, a GAP COMPLETE command is sent by the terminal to the program execution module.

Figure 10:
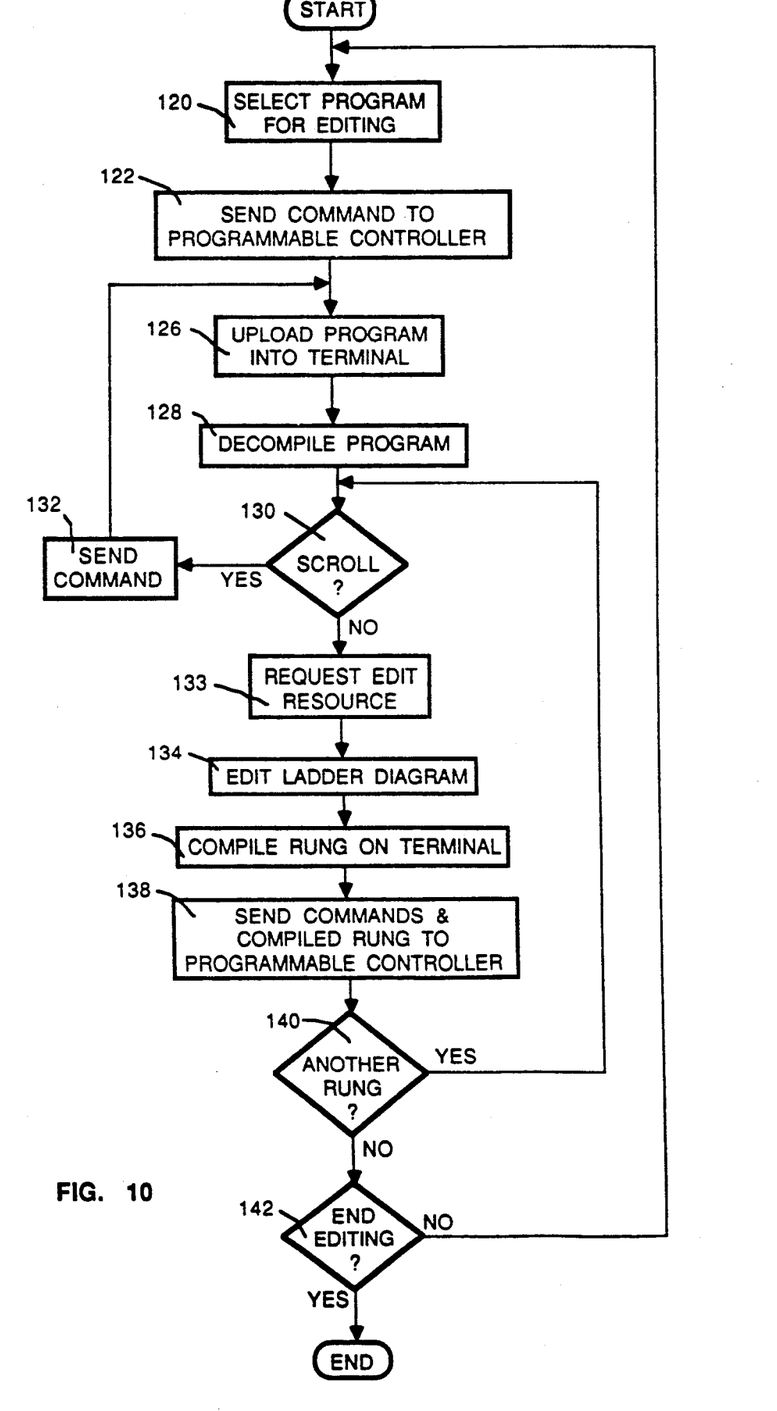
FIG. 10 shows a flow chart of the present program editing process.

After each rung edit is complete, the editing process depicted in FIG. 10 inquires at step 140 whether the operator desires to edit another rung. If so, the process returns to step 130, where the next rung is changed. Once all of the changes have been made to the ladder diagram, the operator is queried at step 142 to indicate whether additional editing is to be done. If so the editing routine returns to step 120, otherwise the process ends.

| Appendix | | | |
|---|---|---|---|
| Rung 1 | | | |
| 1 | === | | |
| 2 00000:a001 | | SOR | 32$ |
| 3 | === | | |
| 4 00002:0e03 | | XIC.I | 5 // 3 |
| 5 | === | | |
| 6 00004: | 32$ | | |
| 7 | === | | |
| 8 00004: 4809 | | OTE.I | 9 // 2 |
| Rung 2 | | | |
| 1 | === | | |
| 2 00000:a001 | | SOR | 32$ |
| 3 | === | | |
| 4 00002:0e03 | | XIC.I | 5 // 3 |
| 5 | === | | |
| 6 00004: | 32$ | | |
| 7 | === | | |
| 8 00004:fc0e | | STP | 33$ |
| 9 | === | | |
| 10 00006:41f9 0000 0000 | | LEA | 0,A0 |
| 11 0000c:2408 | | MOVE.L | A0,D2 |
| 12 | === | | |
| 13 0000e:2f02 | | MOVE.L | D2,-(A7) |
| 14 | === | | |
| 15 00010:701d | | MOVEQ | #29,D0 |
| 16 00012:2055 | | MOVEA.L | (A5),A0 |
| 17 00014:4e90 | | JSR | (A0) |
| 18 00016:588f | | ADDQ.L | #4,A7 |
| 19 | === | | |
| 20 00018:41fa 0016 | | LEA | (34$,PC),A0 |
| 21 0001c:2488 | | MOVE.L | A0,(A2) |
| 22 0001e:2052 | | MOVEA.L | (A2),A0 |
| 23 00020:4ed0 | | JMP | (A0) |
| 24 | === | | |
| 25 00022: | 33$ | | |
| 26 | === | | |
| 27 00022:0845 | | DC.W | 2117 |
| 28 | === | | |
| 29 0024:8000 0000 | | DC.L | −2147483648 |
| 30 | === | | |
| 31 00028:a000 | | DC.W | 40960 |
| 32 | === | | |
| 33 0002a:0000 0000 | | DC.L | 0 |
| 34 | === | | |
| 35 0002e:3fe0 | | DC.W | 16352 |
| 36 | === | | |

| -continued | |
|---|---|
| Appendix | |
| 37 00030: | 34$ |

What is claimed is:

1. In a programmable logic controller for use in executing an object code control program including a plurality of contiguous program data sectors which correspond to sequential program steps and which include a first section containing general purpose processor instructions and a second section containing tokenized source code information statements for accurately reconstructing source code instructions corresponding to said general purpose processor instructions for program editing purposes, a method for processing said control program at run time for control execution and during program decompiling for full source code reconstruction comprising the steps of:
   A) processing each of said control program sectors at run time by:
      1) executing said general purpose processor instructions in the first section in each of said sectors, and
      2) jumping over said tokenized source code information statements in the second section in each of said sectors; and
   B) processing each of said control program sectors during decompiling by:
      1) skipping over said general purpose processor instructions in the first section in each of said sectors, and
      2) generating source code instructions from said tokenized source code information statements in the second section of each of said sectors.

2. The method of claim 1, wherein said step of jumping over said source code information is initiated with a jump instruction (JMP) at the end of said first sections.

3. The method of claim 1, wherein said step of skipping over said general purpose instructions is initiated with a stop execution instruction (STP) in said first section which specifies an offset to a corresponding third section.

4. The method of claim 1, wherein said program sectors correspond to ladder rungs in a ladder language industrial control program.

5. In a programmable logic controller for use in executing an object code control program including a plurality of contiguous program data sectors which correspond to sequential program steps and which include a first section containing special purpose co-processor instructions having one-to-one relationship with source code instructions, a second section containing general purpose co-processor instructions and a third section containing source code information for accurately reconstructing source code instructions corresponding to said general purpose co-processor instructions for program editing purposes, a method for processing said control program at run time for control execution and during program decompiling for full source code reconstruction compromising the steps of:
   A) processing each of said control program sectors at run time by:
      1) executing said special purpose co-processor instructions in the first section in each of said sectors, 2) executing said general purpose co-processor instructions in the second section in each of said sectors, and
3) jumping over said source code information in the third section in each of said sectors; and B) processing each of said control program sectors during decompiling by:
1) generating source code instructions from said special purpose co-processor instructions in the first section in each of said sectors,
2) skipping over said general purpose co-processor instructions in the second section in each of said sectors, and
3) generating source code instructions from said source code information in the third section of each of said sectors.

6. The method of claim 5, wherein said step of jumping over said source code information is initiated with a jump instruction (JMP) at the end of said second sections.

7. The method of claim 5, wherein said step of skipping over said general purpose instructions is initiated with a stop execution instruction (STP) in said first section with specifies an offset to a corresponding third section.

8. The method of claim 5, wherein said program sectors correspond to ladder rungs in a ladder language industrial control program.

9. The method of claim 5, wherein said source code information in said third sections comprises tokenized source code information statements.

10. The method of claim 5, wherein the ends of said third sections containing tokenized source code instruction statements are designated by fixed instruction statements.

11. The method of claim 5, wherein said special purpose co-processor instructions comprise bit co-processor instructions.

12. In a programmable logic controller for use in executing an object code control program including a plurality of contiguous program data sectors which correspond to sequential program steps and which include a first section containing special purpose co-processor instructions having one-to-one relationships with source code instructions, a second section containing general purpose co-processor instructions and a third section containing source code information for accurately reconstructing source code instructions corresponding to said general purpose co-processor instructions for program editing purposes, a system for processing said control program at run time for control execution and during program decompiling for full source code reconstruction comprising:

A) means for processing each of said control program sectors at run time by:
1) executing said special purpose co-processor instructions in the first section in each of said sectors,
2) executing said general purpose co-processor instructions in the second section in each of said sectors, and
3) jumping over said source code information in the third section in each of said sectors; and B) means for processing each of said control program sectors during program decompiling by:
1) generating source code instructions from said special purpose co-processor instructions in the first section in each of said sectors,
2) skipping over said general purpose co-processor instructions in the second section in each of said sectors, and
3) generating source code instructions from said source code information in the third section of each of said sectors.

13. The system of claim 12, wherein the functional step of jumping over said source code information is initiated with a jump instruction (JMP) at the end of said second sections.

14. The system of claim 12, wherein the functional step of skipping over said general purpose instructions is initiated with a stop execution instruction (STP) in said first section which specifies an offset to a corresponding third section.

15. The method of claim 12, wherein said program sectors correspond to ladder rungs in a ladder language industrial control program.

16. The method of claim 12, wherein said source code information in said third sections comprises tokenized source code instruction statements.

17. The method of claim 16, wherein the ends of said third sections containing tokenized source code instruction statements are designated by fixed instruction statements.

18. The method of claim 12, wherein said special purpose co-processor instructions comprise bit co-processor instructions.

* * * * *